United States Patent
Fox, Jr.

(10) Patent No.: US 9,452,842 B1
(45) Date of Patent: *Sep. 27, 2016

(54) PARACHUTE CANOPY INSERT

(71) Applicant: Roy L. Fox, Jr., Belleville, WV (US)

(72) Inventor: Roy L. Fox, Jr., Belleville, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,536

(22) Filed: Oct. 26, 2015

Related U.S. Application Data

(63) Continuation of application No. 14/803,804, filed on Jul. 20, 2015, now Pat. No. 9,187,181.

(51) Int. Cl.
  *B64D 17/02* (2006.01)
  *B64D 17/18* (2006.01)
  *B64D 17/62* (2006.01)

(52) U.S. Cl.
  CPC ............. *B64D 17/18* (2013.01); *B64D 17/62* (2013.01); *B64D 2700/62491* (2013.01)

(58) Field of Classification Search
  CPC ...... B64D 17/00; B64D 17/02; B64D 17/10; B64D 17/12; B64D 17/14; B64D 17/16; B64D 17/18; B64D 17/20
  USPC .................................................. 244/142, 145
  See application file for complete search history.

(56) References Cited

U.S. PATENT DOCUMENTS

| | | | |
|---|---|---|---|
| 1,834,370 A | 12/1931 | Askam | |
| 2,770,432 A | 11/1956 | Stevinson | |
| 2,954,191 A * | 9/1960 | Moran | B64D 17/34 244/145 |
| 3,136,508 A * | 6/1964 | Sepp, Jr. | B64D 17/00 244/145 |
| 3,531,067 A | 9/1970 | Mitchell | |
| 5,037,042 A | 8/1991 | Calianno | |
| 5,839,695 A | 11/1998 | Puskas | |
| 6,443,396 B1 | 9/2002 | Berland | |
| 7,261,258 B1 | 8/2007 | Fox, Jr. | |
| 8,118,262 B2 | 2/2012 | Jameson | |
| 8,851,426 B1 | 10/2014 | Fox, Jr. | |
| 9,187,181 B1 * | 11/2015 | Fox, Jr. | B64D 17/02 |

FOREIGN PATENT DOCUMENTS

GB  1313037  4/1973

\* cited by examiner

*Primary Examiner* — Richard G Davis
(74) *Attorney, Agent, or Firm* — Snell & Wilmer L.L.P.

(57) ABSTRACT

Inserts for parachutes, for example modified cruciform parachutes, provide improved structural strength and reduced inflation times. An exemplary insert comprises a high-strength fabric coupled to center panels at a set of discrete points. The insert at least partially blocks airflow between the center panels, allowing the parachute canopy to inflate more rapidly. Via use of an insert, other components of a parachute, such as center panels, may be made of lighter, lower strength, and/or less expensive material without compromising the load-carrying capacity or reliability of the parachute.

16 Claims, 15 Drawing Sheets

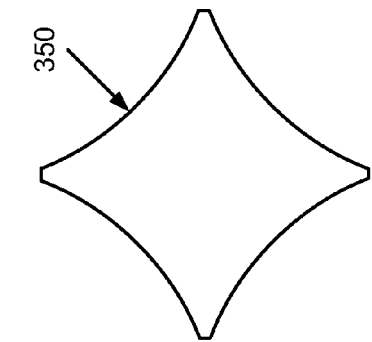
FIG. 3A
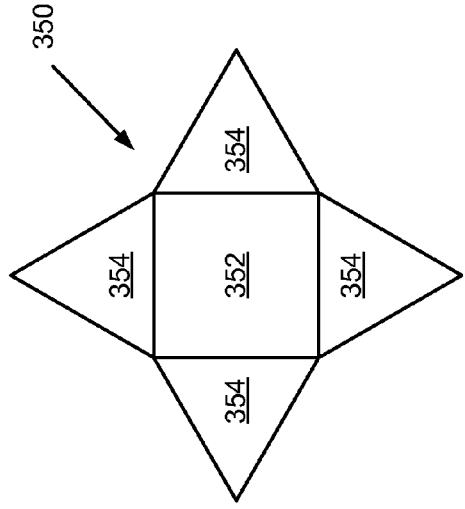
FIG. 3B
FIG. 3C
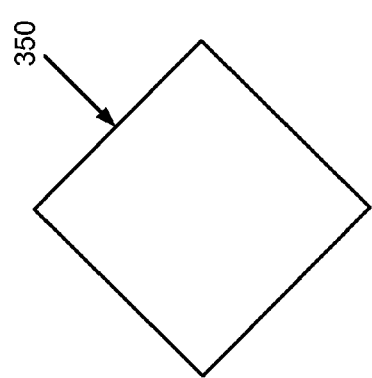
FIG. 3D
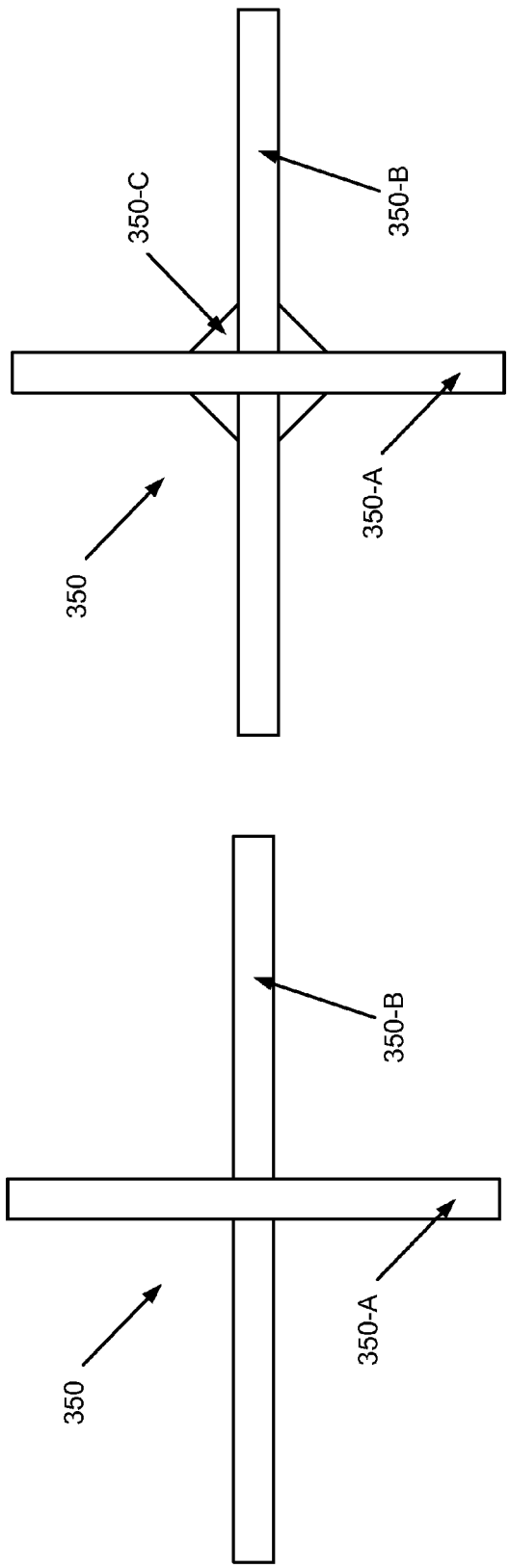
FIG. 3E

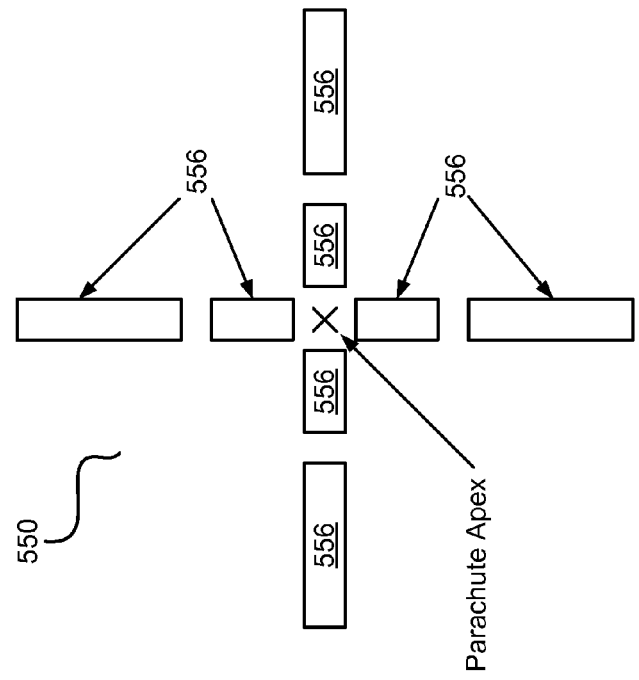
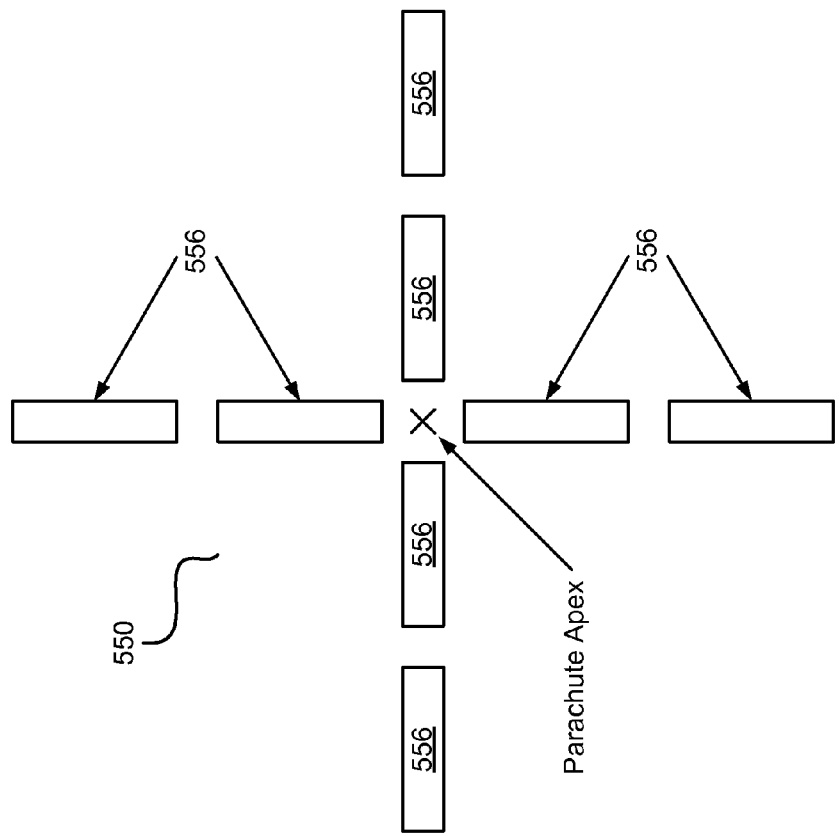

PARACHUTE CANOPY INSERT

CROSS REFERENCE TO RELATED APPLICATIONS

This application is a continuation of U.S. Ser. No. 14/803,804 filed on Jul. 20, 2015 and entitled "PARACHUTE CANOPY INSERT". The entire contents of the foregoing application are hereby incorporated by reference for all purposes.

TECHNICAL FIELD

The present disclosure relates to parachutes, and more particularly to reinforcing components utilized in connection with parachutes.

BACKGROUND

Parachutes are an integral component of systems used to deliver cargo or loads aerially to remote or inaccessible locations. To deliver a load aerially, the load is furnished with a parachute delivery system and transported to the delivery site by aircraft. Upon reaching the delivery site, the load is released, ejected or dropped from the aircraft. Shortly after release, a parachute is deployed, which is typically attached to the load by suspension lines and other rigging. The deployed parachute decelerates the descending load to a velocity at which the load may land on the ground or water without damage.

Prior parachutes, including prior cruciform-type parachutes, have suffered from various deficiencies, such as excessive manufacturing expense, aerodynamic (i.e., structural) inefficiency, excessive delays in inflation, structural weaknesses, and/or the like. Therefore, improved parachutes, including inserts and add-ons thereto, and related methods of construction and use remain desirable.

SUMMARY

In an exemplary embodiment, a modified cruciform parachute comprises four center panels. Each center panel is coupled to at least two other center panels at a set of discrete points, and adjacent points in the set of discrete points have a gap permitting airflow therebetween. The modified cruciform parachute further comprises an insert coupled to the four center panels at a plurality of points in the set of discrete points. When the modified cruciform parachute is inflated, the insert at least partially blocks airflow through a plurality of the gaps.

In another exemplary embodiment, a method for reinforcing a parachute comprises forming a modified cruciform parachute having four center panels. Each center panel is coupled to at least two other center panels at a set of discrete points, and adjacent points in the set of discrete points have a gap permitting airflow therebetween. The method further comprises coupling an insert to the four center panels at a plurality of points in the set of discrete points. When the parachute is inflated, the insert at least partially blocks airflow through a plurality of the gaps.

In another exemplary embodiment, an insert for a cruciform parachute comprises a first portion comprising a first strip of material and a second, parallel strip of material. The first strip and the second strip at least partially overlap one another and are removably coupled together via stitching. The insert further comprises a second portion comprising a third strip of material and a fourth, parallel strip of material. The third strip and the fourth strip at least partially overlap one another and are removably coupled together via stitching. The first portion and the second portion are disposed crosswise of one another and removably coupled to one another, and the portion of the insert where the first portion and the second portion overlap one another is configured to be disposed at the apex of the cruciform parachute.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIGS. 3A, 3B, 3C, 3D, 3E, and 3F illustrate configurations of an insert in accordance with various exemplary embodiments;

FIGS. 5A, 5B, and 5C illustrate configurations of an insert in accordance with various exemplary embodiments;

DETAILED DESCRIPTION

Figure 1A:
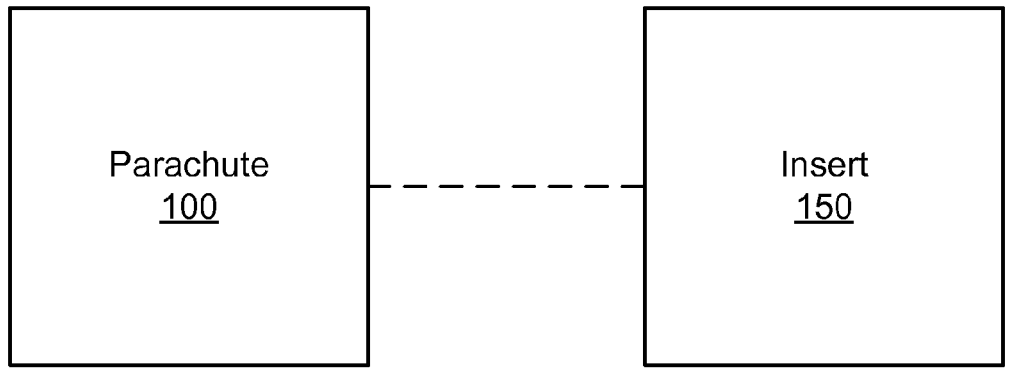
FIG. 1A illustrates a relationship between a parachute and an insert in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for parachute construction, configuration, reinforcement, deployment, recovery, reefing, disreefing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical insert or parachute configured with the same.

When portions of a parachute (for example, center panels of a cruciform parachute) are coupled together at discrete points, gaps may arise between the coupling points. The gaps allow air to pass therethrough during inflation of the parachute, delaying full inflation. When the parachute is fully inflated, the total gap area is typically only a small percentage of the canopy area, so the airflow therethrough may be of little concern. However, at the onset of parachute inflation, the total gap area, particularly near the apex/crown of the parachute, can be a much larger percentage of the canopy area (for example, near the apex/crown of the parachute, the gap area may be up to about 95% of the total apex/crown area; at the periphery of the parachute canopy, the gap area is typically much smaller and may be as small as about 1% of the total area). As the parachute canopy fills with air, the gaps usually reduce in size—leading to somewhat of a "catch-22" situation: if the gaps are open, air blockage in the parachute canopy can be poor—but air blockage in the parachute canopy serves to at least partially close the gaps. Of course, given sufficient deployment time, the parachute canopy eventually inflates and the gaps eventually at least partially close. However, inflation delays arising from the gaps are of concern, particularly in low altitude deployments where a delay of even a fraction of a second can be problematic.

Additionally, because the crown area of a circular parachute canopy is closer to perpendicular to the airflow than other portions of the parachute canopy, that area is exposed to higher stresses than other portions of the canopy, particularly during inflation. To accommodate such higher stresses, parachutes often utilize higher-strength materials and/or additional reinforcements in the crown area than are used in the remainder of the parachute canopy. However, this approach often adds significant expense and can also add significant weight to the overall parachute.

These and other deficiencies of prior parachutes may be addressed via application of principles of the present disclosure. By utilizing an insert as described herein, parachute inflation times may be reduced because the insert at least partially blocks air leakage between discrete coupling points in the canopy crown. Additionally, by utilizing an insert as described herein, parachute canopies may be strengthened in high-stress areas, reducing the need for large panels of higher-strength materials and/or large-scale reinforcements, and thus reducing parachute expense and weight. Parachute failure rates at high dynamic pressures may be reduced. Construction costs may be reduced. Parachute construction may be simplified.

Additional details regarding cruciform parachutes may be found in U.S. Pat. Nos. 7,261,258 and 8,851,426 to Fox, the contents of which are incorporated herein by reference.

With reference now to FIG. 1A, in various exemplary embodiments, a parachute 100 may be coupled to an insert 150. Insert 150 may be disposed on the interior of the canopy of parachute 100; alternatively, insert 150 may be disposed on the exterior of the canopy of parachute 100. Insert 150 may be removably coupled to parachute 100; alternatively, insert 150 may be permanently affixed to parachute 100. Moreover, insert 150 may be added-on to an existing parachute 100. Parachute 100 may be any circular-style parachute, for example a flat circular parachute, a cruciform parachute, a modified cruciform parachute, a circular parachute configured as a modular design (for example, a parachute configured with two semi-circular canopy modules, a set of "pie slice" shaped canopy modules, etc.), and/or the like. Insert 150 is configured to modify the geometric porosity of parachute 100; stated another way, insert 150 is configured to at least partially block airflow through the canopy of parachute 100, for example by at least partially blocking gaps therein. Additionally, insert 150 may improve the strength, durability, and/or repairability of parachute 100, for example by providing structural reinforcement and/or facilitating simplified removal and replacement of parachute 100 modules.

In particular, principles of the present disclosure contemplate use of insert 150 with parachutes configured as modular designs. Modular designs make parachute fabrication easier. Modular designs also make parachute maintenance easier: when a parachute module is damaged, that module may be removed and sent for repairs, and a replacement module may be installed so that the parachute may quickly be returned to service.

Figure 1B:
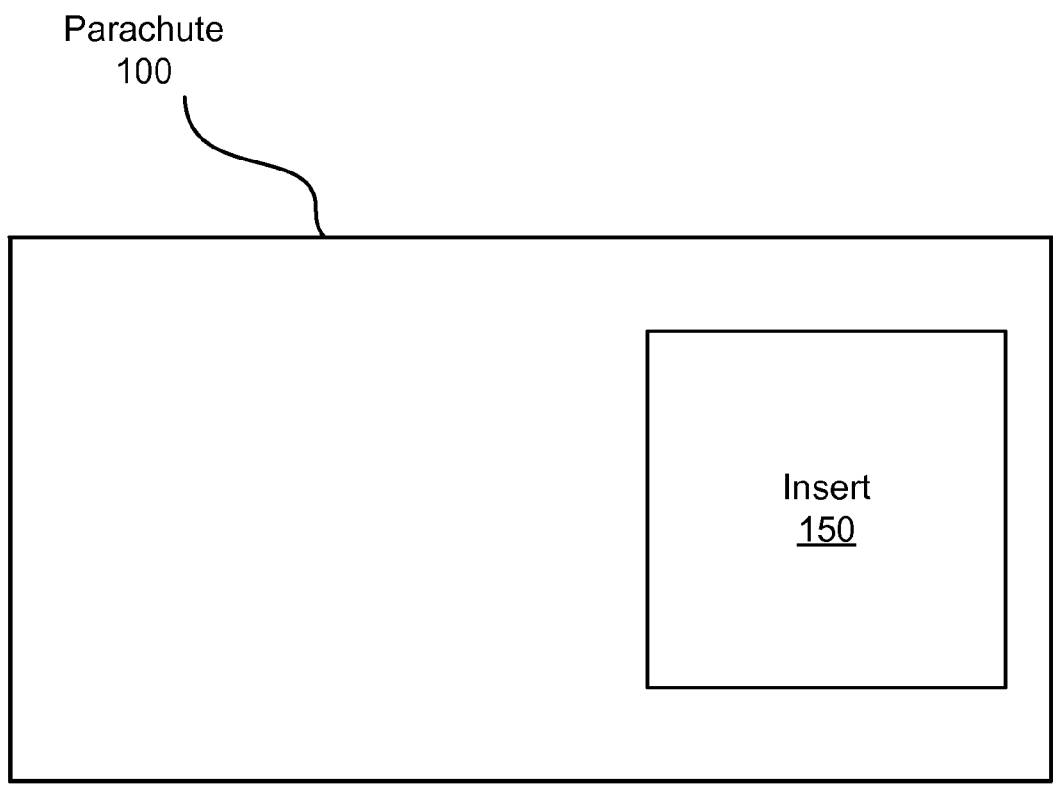
FIG. 1B illustrates a parachute configured with an insert in accordance with an exemplary embodiment.

Turning now to FIG. 1B, in various exemplary embodiments, a parachute 100 may be configured with an insert 150 when parachute 100 is originally constructed. In these exemplary embodiments, other components of parachute 100 (for example seams, webbing, gores, suspension lines, reefing components, and/or the like) may be sized and/or configured to accommodate the presence of (and/or benefit from the inclusion of) insert 150. For example, a cruciform parachute having an insert 150 may utilize center panels made of the same material as the side panels, rather than a heavier, stronger, and/or more expensive material for the center panels, as insert 150 may provide a suitable level of structural reinforcement to parachute 100 such that use of the heavier, stronger, and/or more expensive material for the center panels is unnecessary.

Typical prior simple cruciform (or cross-style) parachute canopies comprised a center panel and side panels. While the center panel is typically square, the width to length ratio of the side panels may vary, depending on the desires of the parachute designer. Both the center panel and the side panels may be fabricated from multiple sub-panels and each panel may have reinforcements and venting orifices distributed within it. Additionally, the panels may be closely joined, essentially forming a single-piece parachute canopy, or they may be joined only at discrete points, allowing venting between the panels.

Figure 2A:
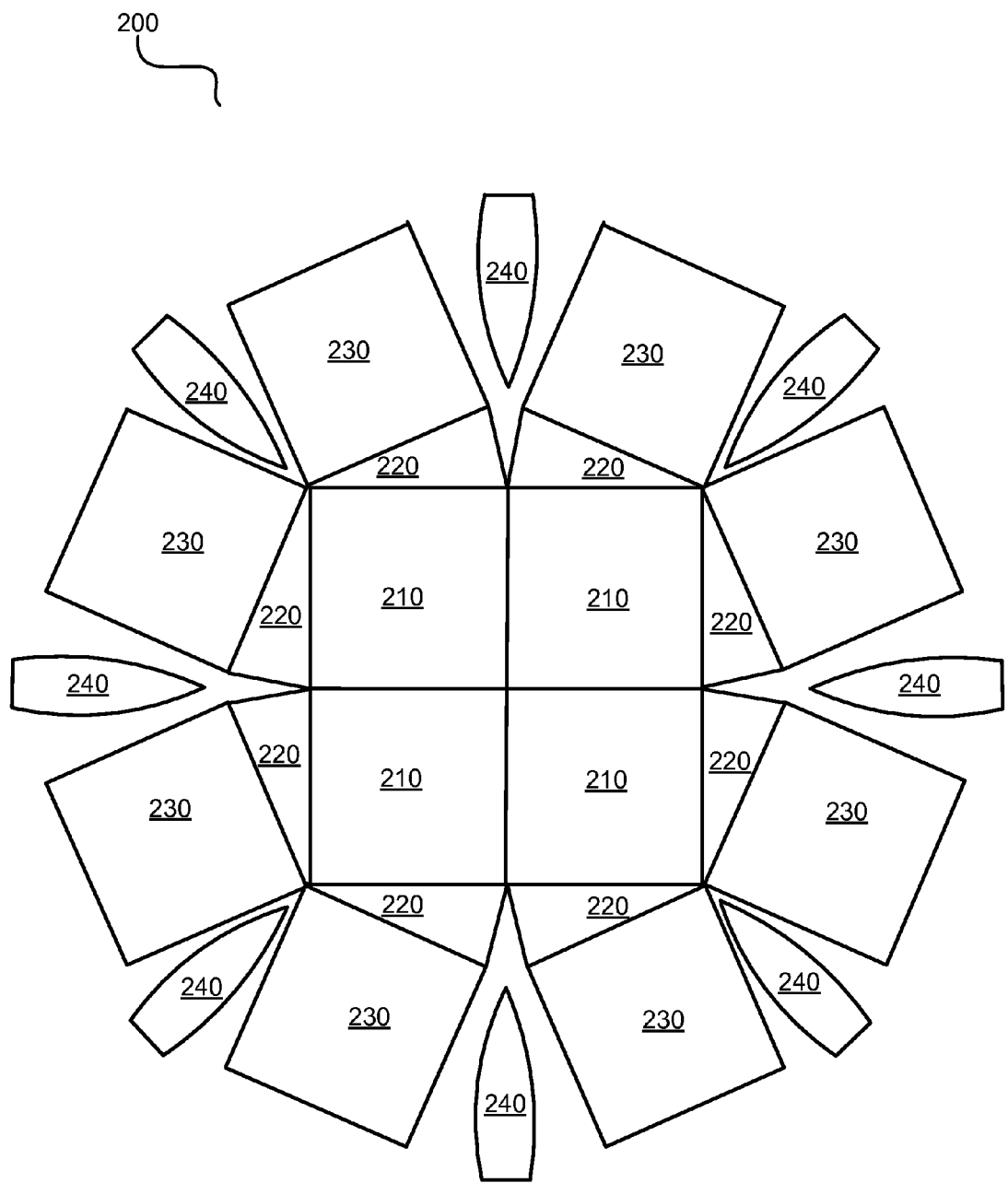
FIG. 2A illustrates exemplary components of a modified cruciform parachute in accordance with an exemplary embodiment.

Turning now to FIG. 2A, in accordance with an exemplary embodiment, a modified cruciform parachute 200 comprises a plurality of center panels 210, a plurality of side panels 230, and a plurality of corner panels 240. Center panel(s) 210, side panels 230, and corner panels 240 are coupled together to form a parachute canopy. Modified cruciform parachute 200 may also comprise a plurality of shoulder panels 220.

Modified cruciform parachute 200 may be configured to be compatible for use with an inlet chute reefing device, for example as disclosed in U.S. Pat. No. 8,096,509 to Fox, the contents of which are incorporated herein by reference in their entirety.

Figure 2B:
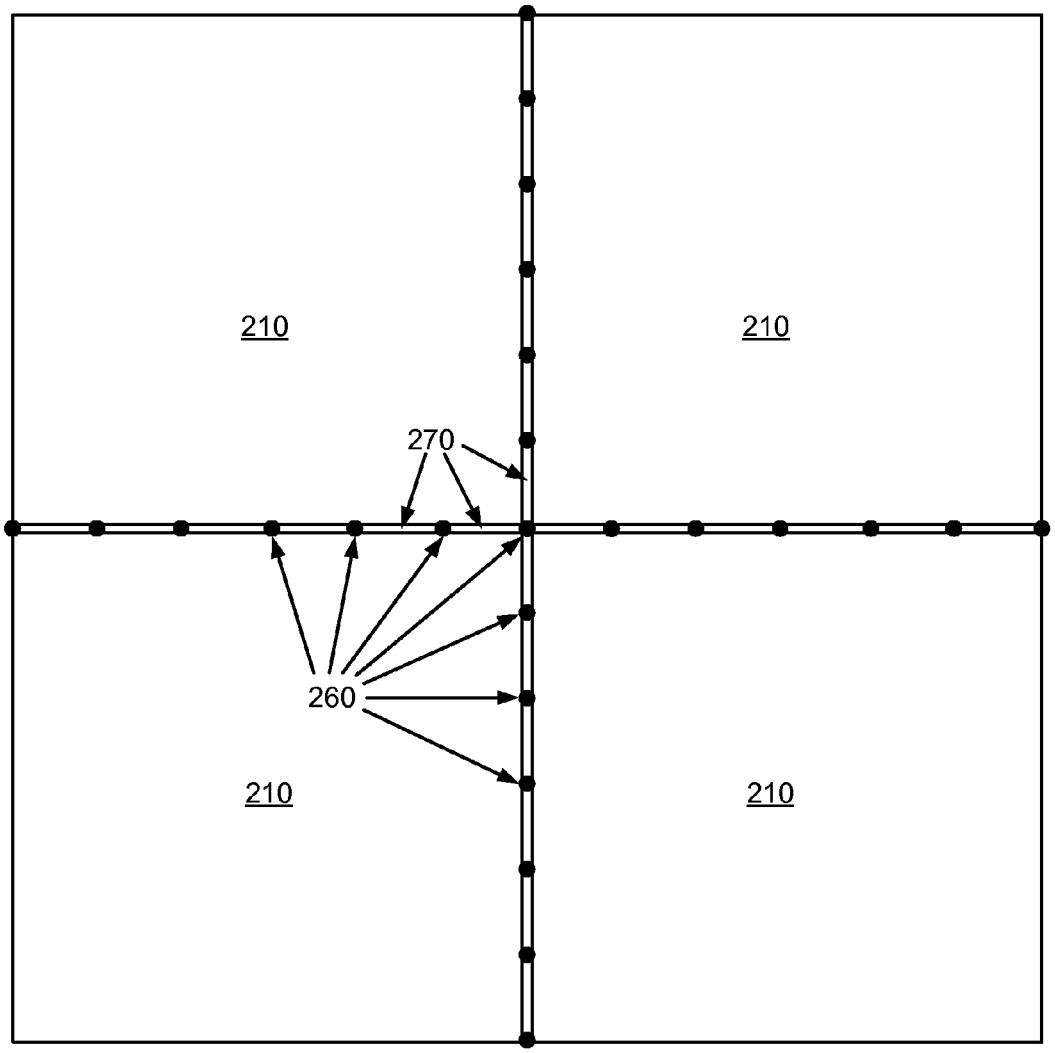
FIG. 2B illustrates components of a parachute coupled together at discrete points in accordance with an exemplary embodiment.

In various exemplary embodiments, center panel 210 comprises a suitable material, for example a textile and/or film, such as nylon, mylar (biaxially-oriented polyethylene terephthalate), and/or the like. Center panel 210 may be square, rectilinear, pentagonal, hexagonal, and/or the like, as desired. Center panel 210 may be monolithic; alternatively, center panel 210 may be comprised of sub-panels. Stated another way, center panel 210 may be comprised of multiple center panels 210. For example, as illustrated in FIG. 2B, in an exemplary embodiment, the center portion of the parachute canopy comprises four center panels 210. Center panels 210 may be joined at discrete points 260. These combined panels may be considered to be a center panel 210. When multiple center panels 210 are utilized in modified cruciform parachute 200, venting may be provided therein and/or therebetween. Center panels 210 may be joined to one another and/or to other components of modified cruciform parachute 200 via any suitable means, for example via stitching, taping, lacing, gluing, and/or the like.

In various exemplary embodiments, center panel 210 may be similarly sized and/or identical to other panels in modified cruciform parachute 200, for example side panel 230. In this manner, manufacturing costs may be reduced, and assembly and/or repair of modified cruciform parachute 200 may be simplified, because components may be interchangeable.

In an exemplary embodiment, modified cruciform parachute 200 comprises four center panels 210. In another exemplary embodiment, modified cruciform parachute 200 comprises nine center panels 210. In yet another exemplary embodiment, modified cruciform parachute 200 comprises sixteen center panels 210. Any suitable number and/or size of center panels 210 may be utilized, for example in order to achieve a desired configuration of modified cruciform parachute 200.

In various exemplary embodiments, modified cruciform parachute 200 comprises a plurality of side panels 230. Side panel 230 comprises a suitable material, for example a textile and/or film, such as nylon, mylar, and/or the like. In modified cruciform parachute 200, side panel 230 may comprise a similar material to other panels, for example center panel 210; moreover, side panel 230 may comprise different materials than other panels, for example in order to achieve a desired strength, flexibility, and/or the like. Side panel 230 may be square, rectilinear, trapezoidal, and/or the like, as desired. Side panel 230 may be monolithic; alternatively, side panel 230 may be comprised of sub-panels. Stated another way, side panel 230 may be comprised of multiple side panels 230. For example, as illustrated in FIG. 2A, in an exemplary embodiment, each side portion of the parachute canopy comprises two square side panels 230. These combined panels may be considered to be a rectangular side panel 230. When multiple side panels 230 are utilized in modified cruciform parachute 200, venting may be provided therein and/or therebetween. Side panels 230 may be joined to one another and/or to other components of modified cruciform parachute 200 via any suitable means, for example via stitching, taping, lacing, gluing, and/or the like.

In various exemplary embodiments, side panel 230 may be similarly sized and/or identical to other panels in modified cruciform parachute 200, for example center panel 210. In this manner, manufacturing costs may be reduced, and assembly and/or repair of modified cruciform parachute 200 may be simplified.

In an exemplary embodiment, modified cruciform parachute 200 comprises four side panels 230, with one disposed on each side of center panel 210. In another exemplary embodiment, modified cruciform parachute 200 comprises eight side panels 230, with two disposed on each side of center panel 210 (for example, as illustrated in FIG. 2A). In yet another exemplary embodiment, modified cruciform parachute 200 comprises twelve side panels 230. Any suitable number and/or size of side panels 230 may be utilized, for example in order to achieve a desired configuration of modified cruciform parachute 200.

In various exemplary embodiments, modified cruciform parachute 200 comprises a plurality of corner panels 240. Corner panel 240 is configured to allow modified cruciform parachute 200 to more closely resemble a hemispherical parachute when deployed, improving aerodynamic efficiency. Additionally, corner panel 240 may be configured to facilitate reefing of modified cruciform parachute 200.

In various exemplary embodiments, corner panel 240 comprises a suitable material, for example a textile and/or film, such as nylon, mylar, and/or the like. In modified cruciform parachute 200, corner panel 240 may comprise a similar material to other panels; moreover, corner panel 240 may comprise different materials than other panels, for example in order to achieve a desired strength, flexibility, and/or the like. Corner panel 240 may be tapered, triangular, curvilinear, and/or the like, as suitable, in order to achieve a desired inflated configuration of modified cruciform parachute 200. Corner panel 240 may be monolithic; alternatively, corner panel 240 may be comprised of sub-panels. Stated another way, corner panel 240 may be comprised of multiple corner panels 240. For example, in an exemplary embodiment, two triangular corner panels 240 may be disposed adjacent to one another and coupled together to form a larger, triangular-shaped corner panel 240. These combined panels may be considered to be a corner panel 240. When corner panels 240 are utilized in modified cruciform parachute 200, venting may be provided therein, therebetween, and/or between corner panels 240 and other components of modified cruciform parachute 200, for example between a corner panel 240 and a side panel 230. Corner panels 240 may be joined to one another and/or to other components of modified cruciform parachute 200 via any suitable means, for example via stitching, taping, lacing, gluing, and/or the like.

In an exemplary embodiment, modified cruciform parachute 200 comprises four corner panels 240, with one corner panel 240 disposed at each "corner" of the parachute canopy (i.e., approximately at 45, 135, 225, and 315 degrees). In another exemplary embodiment, modified cruciform parachute 200 comprises four corner panels 240, with one corner panel 240 disposed at approximately 0, 90, 180, and 270 degrees on the parachute canopy. In yet other exemplary embodiments, an exemplary modified cruciform parachute (for example, modified cruciform parachute 200) may comprise eight corner panels (for example, corner panels 240) spaced approximately equally about the canopy perimeter. Moreover, modified cruciform parachute 200 may comprise any suitable number of corner panels 240, and such corner panels 240 may be disposed at any compass location around the canopy perimeter, in order to achieve a desired configuration of modified cruciform parachute 200.

In various exemplary embodiments, modified cruciform parachute 200 comprises one or more shoulder panels 220. Shoulder panels 220 may be configured to equalize (or reduce inequality between) load lengths in modified cruciform parachute 200. Shoulder panel 220 comprises a suitable material, for example a textile and/or film, such as nylon, mylar, and/or the like. In modified cruciform parachute 200, shoulder panel 220 may comprise a similar material to other panels, for example center panel 210; moreover, shoulder panel 220 may comprise different materials than other panels, for example in order to achieve a desired strength, flexibility, and/or the like. Shoulder panel 220 may be triangular, tapered, and/or the like, as desired. Shoulder panel 220 may be monolithic; alternatively, shoulder panel 220 may be comprised of sub-panels. Stated another way, shoulder panel 220 may be comprised of multiple shoulder panels 220.

In various exemplary embodiments, modified cruciform parachute 200 is configured as a modular design. Stated another way, various elements of modified cruciform parachute 200 may be equivalent and/or interchangeable (for example, center panel 210 and side panel 230), allowing modified cruciform parachute 200 to be created and/or repaired using preformed panels.

In various exemplary embodiments, modified cruciform parachute 200 is constructed via complete joining of the component panels along the corresponding edges. In other exemplary embodiments, modified cruciform parachute 200 is constructed by joining the component panels only at discrete points. In yet other exemplary embodiments, modified cruciform parachute 200 is constructed via complete joining of certain panels, and partial joining of certain other panels. In this manner, the geometric porosity of modified cruciform parachute 200 may be adjusted to the needs of a particular application. For example, a fully joined embodiment may be suitable for instances of low dynamic pressure, while a discretely joined embodiment may be suitable for instances of high dynamic pressure.

Figure 2C:
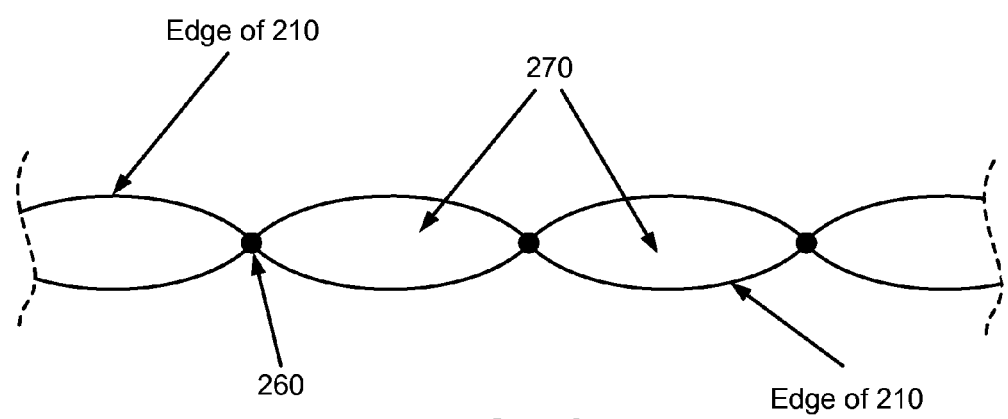
FIG. 2C illustrates gaps between components of a parachute coupled together at discrete points in accordance with an exemplary embodiment.

With reference now to FIGS. 2B and 2C, in various exemplary embodiments, a parachute (for example, modified cruciform parachute 200) may be configured with panels in the canopy crown area (for example, center panels 210) that are joined at discrete coupling points (for example, coupling points 260). During and/or after inflation of the parachute, gaps 270 may exist between the panels, allowing air to flow therethrough. While this airflow may be desirable (for example, to reduce dynamic pressure on a parachute canopy), it may also be undesirable (for example, because it leads to delays in inflation of the parachute canopy).

Figure 2D:
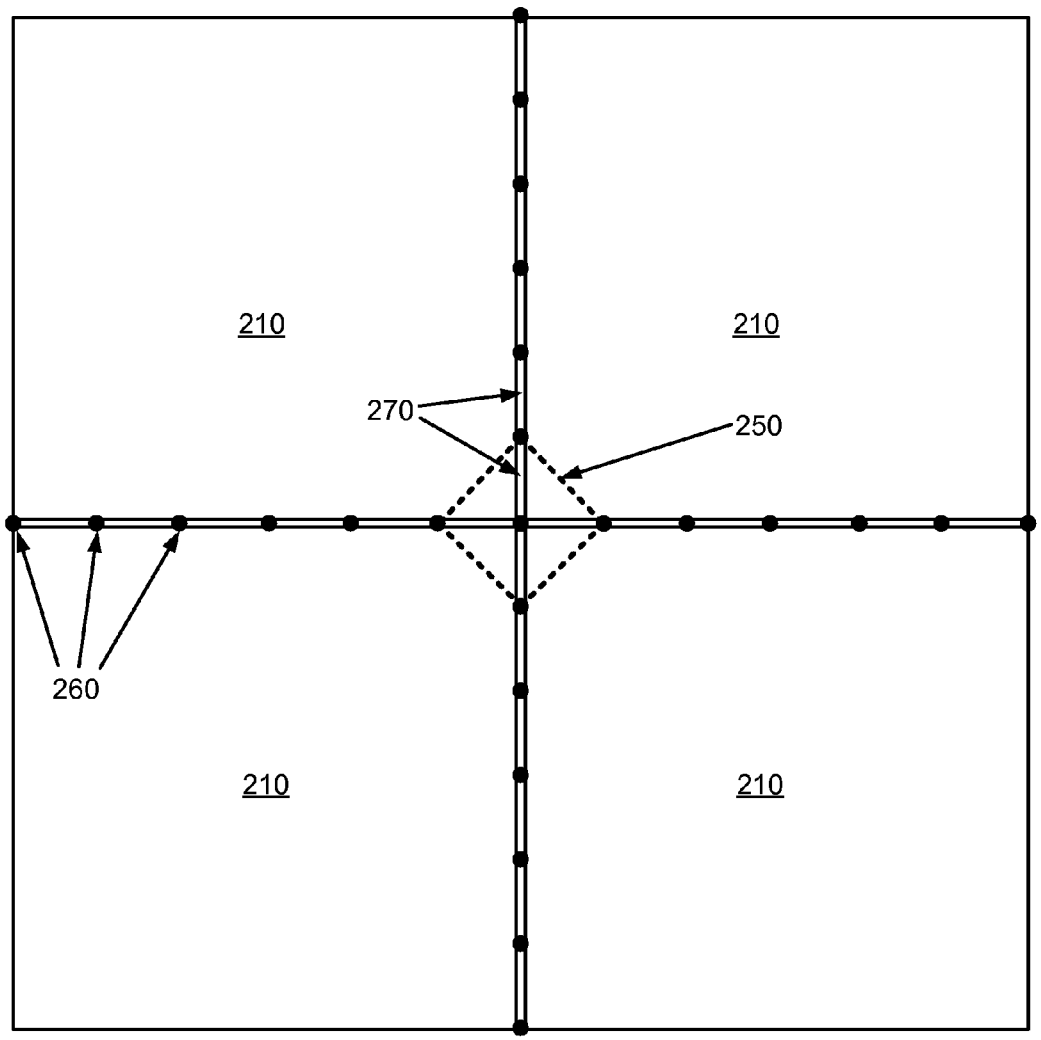
FIGS. 2D, 2E, and 2F illustrate an insert coupled to a parachute in accordance with various exemplary embodiments.
Figure 2E:
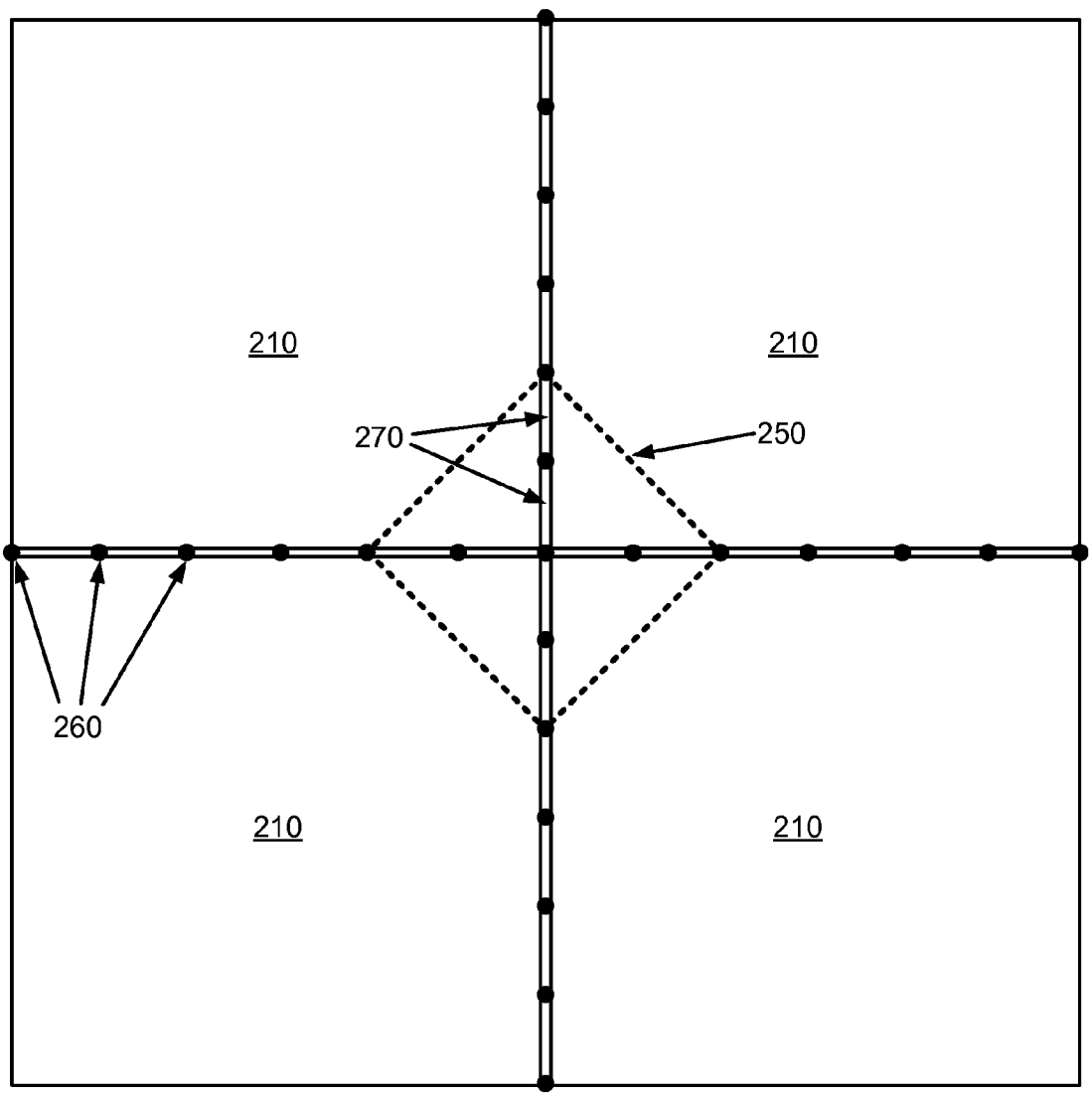
Figure 2F:
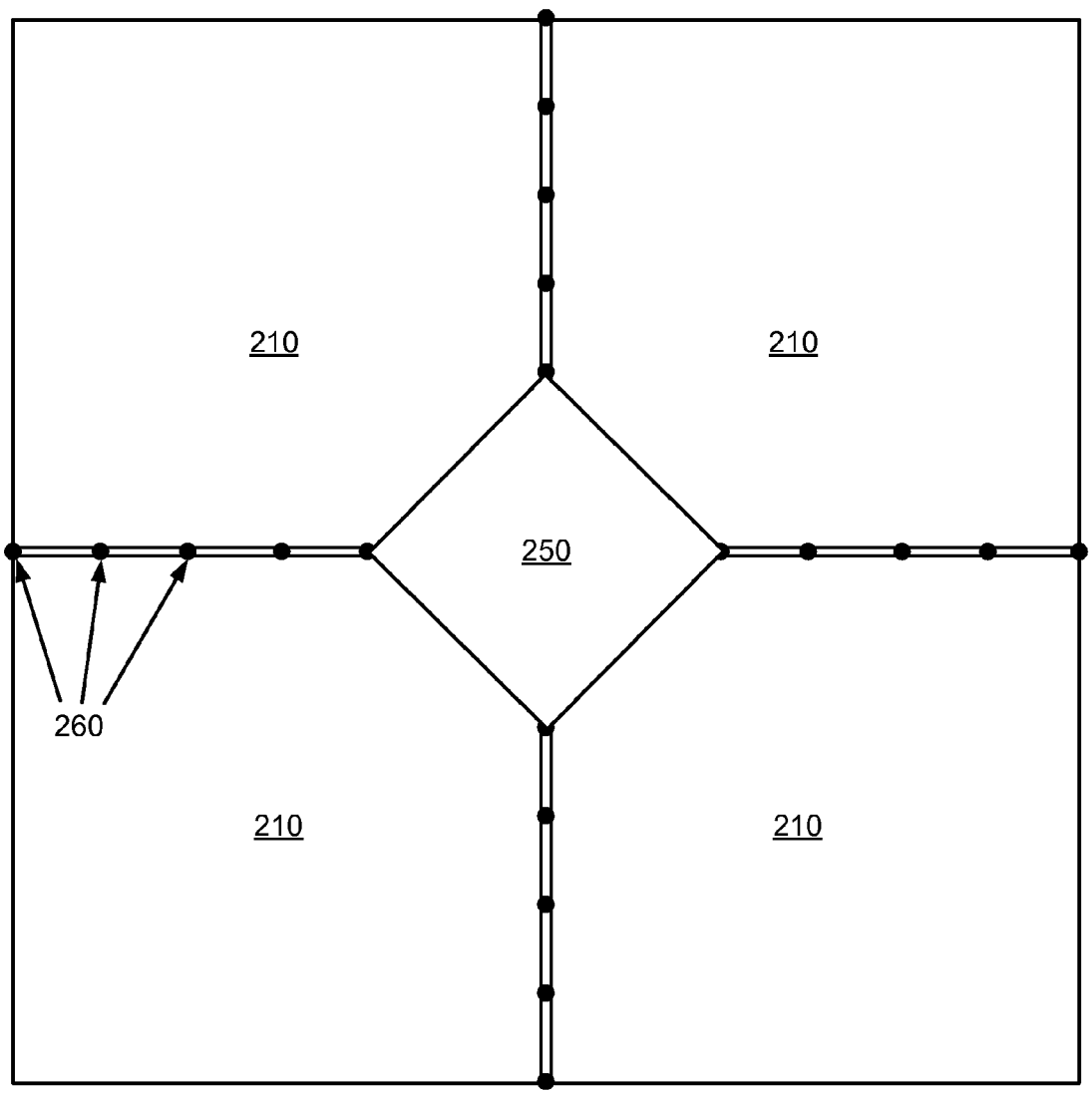

Turning now to FIGS. 2D through 2F, in various exemplary embodiments, an insert 150 (for example, insert 250) may be coupled to center panels 210 (for example, at coupling points 260) in order to partially and/or fully block airflow through one or more gaps 270. Insert 250 may be configured to block airflow through a selected number of gaps 270 in order to reduce overall airflow through the canopy crown of the parachute, leading to faster parachute inflation. Insert 250 may be configured to block airflow through a selected number of gaps 270 by being disposed on the inside of the canopy (for example, as illustrated in FIGS. 2D and 2E); moreover, insert 250 may be configured to block airflow through a selected number of gaps 270 by being disposed on the outside of the canopy (for example, as illustrated in FIG. 2F). Moreover, multiple inserts 250 may be utilized in connection with a single parachute, and such inserts may be disposed on the inside and/or outside of the canopy (or on both sides), as desired.

With reference now to FIGS. 3A through 3E, an insert 150 (for example, insert 350) may be sized, shaped, and/or otherwise configured to achieve at least partial airflow blockage, for example through a desired number of gaps 270. Insert 350 may comprise a textile and/or film, such as nylon, mylar, and/or the like. In an exemplary embodiment, insert 350 comprises a single layer of nylon fabric having a weight of about 1.2 ounces per square yard, and is configured with nylon reinforcing webbing having a width of about ½" at the periphery. Other suitable fabrics, weights, and reinforcing geometries may be utilized, as desired.

In various exemplary embodiments, insert 350 is sized and/or shaped to be suitable for coupling to a parachute at least at some of the same discrete points where other portions of the parachute canopy are coupled to one another (for example, points 260 as illustrated in FIGS. 2B-2F). Moreover, insert 350 may be sized as suitable for use in connection with (and/or as part of) a particular parachute. For example, when insert 350 is utilized with a parachute having 4 square center panels 210 of size about 279"×279", and the center panels 210 are coupled together at the apex and at a series of points 260 spaced at about 31" intervals, insert 350 may be configured with a size of about 62"×62", or a size of about 91"×91", or a size of about 124"×124", and so forth. In this manner, insert 350 edges align closely with the position of points 260. However, insert 350 may be coupled to a parachute via any suitable means and/or at any suitable locations.

For example, insert 350 may be coupled to a parachute via stitching, cord, webbing, and/or the like. In certain exemplary embodiments, insert 350 is configured to achieve a desired three-dimensional shape when a corresponding parachute is fully inflated; thus, the dimensions of insert 350 plus the dimensions of any coupling components may be considered when selecting an insert 350 for a particular parachute. For example, an insert 350 may be sized such that one or more locations on insert 350 do not fully extend to (or, in contrast, extend beyond) a corresponding connection point 260 on a parachute, and a length of cord or webbing may be utilized to connect portions of insert 350 to such corresponding connection points 260.

Figure 3F:
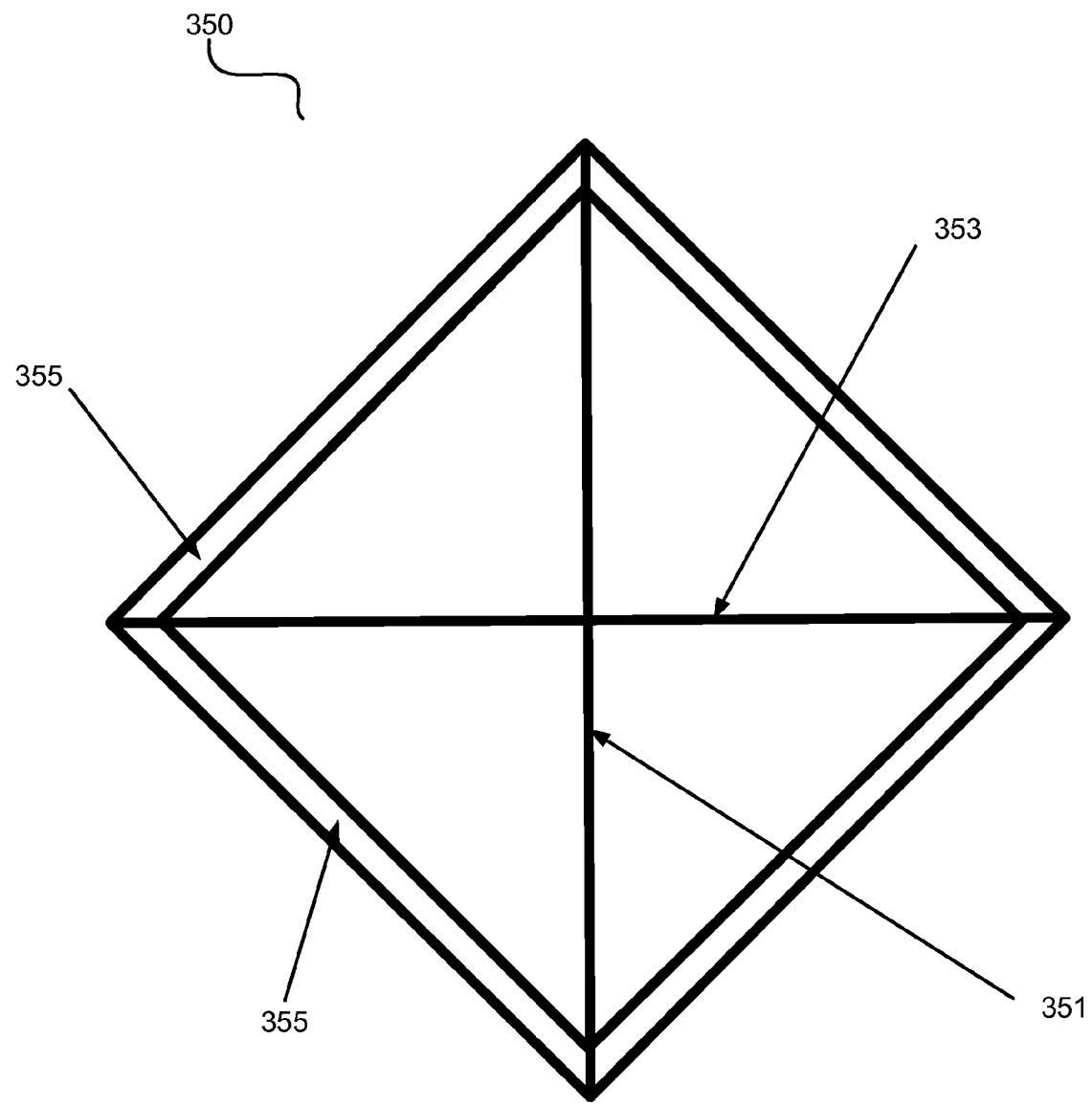

Additionally, with momentary reference to FIG. 3F, insert 350 may be fabricated with various structural reinforcements, for example a first reinforcement 351 extending in a first direction, a second reinforcement 353 extending in a second direction, and one or more peripheral reinforcements 355. In various exemplary embodiments, first reinforcement 351 and second reinforcement 353 are configured to align with (and/or extend at least partially along) borders between panels in a parachute when insert 350 is coupled thereto. These reinforcements may comprise separate reinforcement elements, for example cord or webbing. These reinforcements may also comprise multiple layers of fabric, seams, and/or stitching. Moreover, both separate reinforcement elements and multiple layers/seams may be utilized. Yet further, it will be appreciated that, in connection with use with small parachutes, insert 350 may be constructed without additional structural reinforcements.

In various exemplary embodiments, insert 350 is constructed from fabric such that the weave of the fabric aligns with the existing structural members of the parachute canopy (for example, along the 4 cardinal directions where center panels are joined together). This is desirable as insert 350, responsive to inflation forces, will tend to stretch less than the overlaying fabric (for example, center panels 210), and thus will be exposed to more stress than the overlaying fabric. This feature allows a parachute to be designed to minimize the strength of the overlaying fabric, and maximize the strength of insert 350. In this manner, only a relatively small portion of the parachute canopy (i.e., insert 350) may be constructed of relatively strong, heavy, and/or expensive materials, while the bulk of the parachute canopy may be constructed of relatively lightweight, weaker, and/or less expensive materials.

In various exemplary embodiments, insert 350 is constructed of a material having a generally omni-directional resistance to elongation, for example a mylar film. In these exemplary embodiments, alignment of the material of insert 350 relative to other components of a parachute may be of little concern.

Returning to FIG. 3A, in various exemplary embodiments, insert 350 is configured with a substantially square and/or diamond shape. In these exemplary embodiments, insert 350 may be configured as a single layer of fabric, or as multiple layers of fabric coupled together. Additionally, in this configuration, insert 350 may be configured with structural reinforcements and/or integral attachment components (for example, loops, lanyards, etc.) as disclosed above.

With reference now to FIG. 3B, in some exemplary embodiments, insert 350 is configured as a star-like shape. In these embodiments, insert 350 may be formed from a single piece of fabric; alternatively, insert 350 may be formed from multiple pieces of fabric, for example a square center section 352 and four triangular arm sections 354. It will be appreciated that, while more complex in construction as compared to a square insert 350, a star insert 350 may extend further from the center of the canopy of a parachute, thus at least partially blocking more gaps 270 and thus increasing the speed of inflation of the parachute. Additionally, in this configuration, insert 350 may be configured with structural reinforcements and/or integral attachment components (for example, loops, lanyards, etc.) as disclosed above.

Turning to FIG. 3C, in various exemplary embodiments, insert 350 may be configured with a "concave square" or "fat X" shape. It will be appreciated that in these exemplary embodiments, insert 350 may utilize less material than a similarly-sized square shape insert 350 (thus reducing overall parachute weight), but difficulty of construction is increased due to the curved edges of insert 350. Additionally, in this configuration, insert 350 may be configured with structural reinforcements and/or integral attachment components (for example, loops, lanyards, etc.) as disclosed above.

With reference now to FIGS. 3D and 3E, in various exemplary embodiments, insert 350 may be configured with a "skinny X" or "cross" shape. In these exemplary embodiments, insert 350 may be formed from a first strip of material 350-A and a second strip of material 350-B. Strips 350-A and 350-B may be composed of multiple strips or segments, for example parallel strips of material coupled to one another. Strip 350-A and strip 350-B may be of identical lengths, widths, and/or thicknesses; alternatively, strip 350-A and strip 350-B may differ in length, width, thickness, material, etc. In various exemplary embodiments, strips 350-A and 350-B may be configured with a width as thin as 1". In these exemplary embodiments, insert 350 is desirably coupled to a corresponding parachute at least partially via stitching along the sides of strips 350-A and 350-B, for example via stitching having between about 4 stitches per inch and about 12 stitches per inch; additional coupling components may also be utilized. Additionally, in this configuration, insert 350 may be configured with structural reinforcements and/or integral attachment components (for example, loops, lanyards, etc.) as disclosed above. Insert 350 may also comprise a third portion of material 350-C (for example, a square, a diamond, a circle, and/or the like) disposed at or near the area where 350-A and 350-B intersect (i.e., the location on insert 350 that will correspond to the apex of a parachute canopy).

With continued reference to FIGS. 3A-3F, in various exemplary embodiments, insert 350 is configured as a generally 2-dimensional component (i.e., ignoring the minimal thickness of the material forming insert 350). In other words, insert 350 would generally lay flat when placed on a planar surface. In other exemplary embodiments, insert 350 is configured as a generally 3-dimensional component (i.e., a component having a third dimension in addition to the thickness of the material forming insert 350). For example, when insert 350 is formed from a square panel of nylon fabric, and a reinforcing hem (i.e., reinforcement 355) is sewn around the square panel, the sewing machine applies tension and stretches the somewhat elastic nylon thread included in the hem. Hysteresis causes the thread to return at least partially toward its unstretched length, reducing the length of the periphery of the panel and generating a bulge or "belly" in insert 350; stated another way, in this configuration insert 350 would not lay generally flat (i.e., without wrinkles, folds, or bumps) when placed on a planar surface.

A three-dimensional feature for insert 350 may be particularly desirable when insert 350 is mounted on the exterior of a parachute canopy. For example, a three-dimensional insert 350 allows the parachute canopy to stretch somewhat before coming into contact with insert 350, thus allowing the parachute canopy to absorb some shock while still receiving sufficient reinforcement from insert 350 to prevent canopy rupture. Additionally, because three-dimensional insert 350 is more "parachute-like" in shape than a flat panel, three-dimensional insert 350 can act as a pilot parachute that stabilizes the crown area of the parachute canopy to which it is attached.

Figure 4:
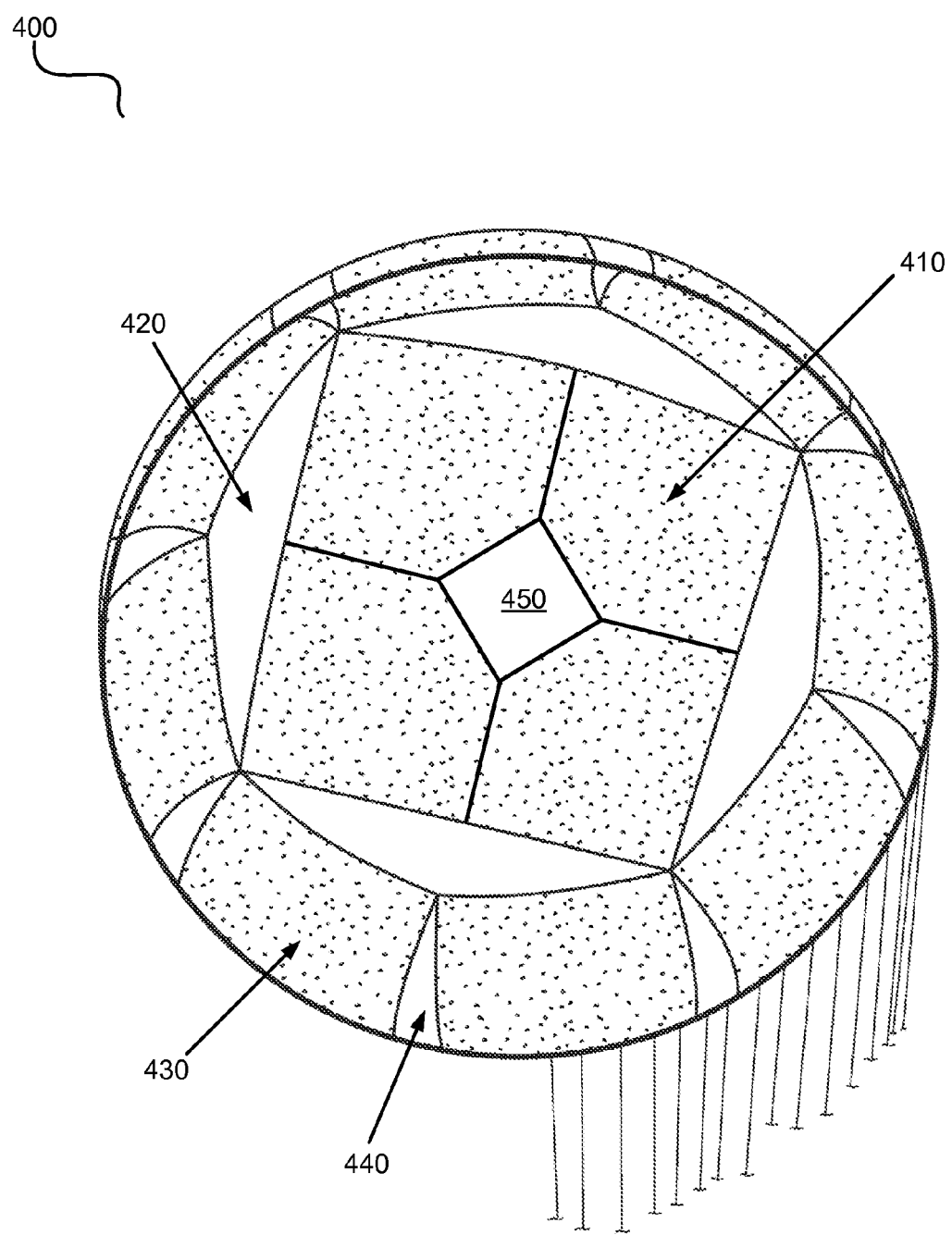
FIG. 4 illustrates an insert coupled to an inflated modified cruciform parachute in accordance with various exemplary embodiments.

Turning now to FIG. 4, in various exemplary embodiments, a modified cruciform parachute 400 is illustrated in an airstream, showing insert 450 disposed on the interior of the parachute canopy substantially at the apex of the canopy. In FIG. 4, for clarity of illustration, it will be appreciated that only a subset of the suspension lines for modified cruciform parachute 400 are shown, and that in actuality modified cruciform parachute 400 and/or insert 450 are usable in connection with suspension lines distributed along the entire parachute skirt.

Figure 5C:
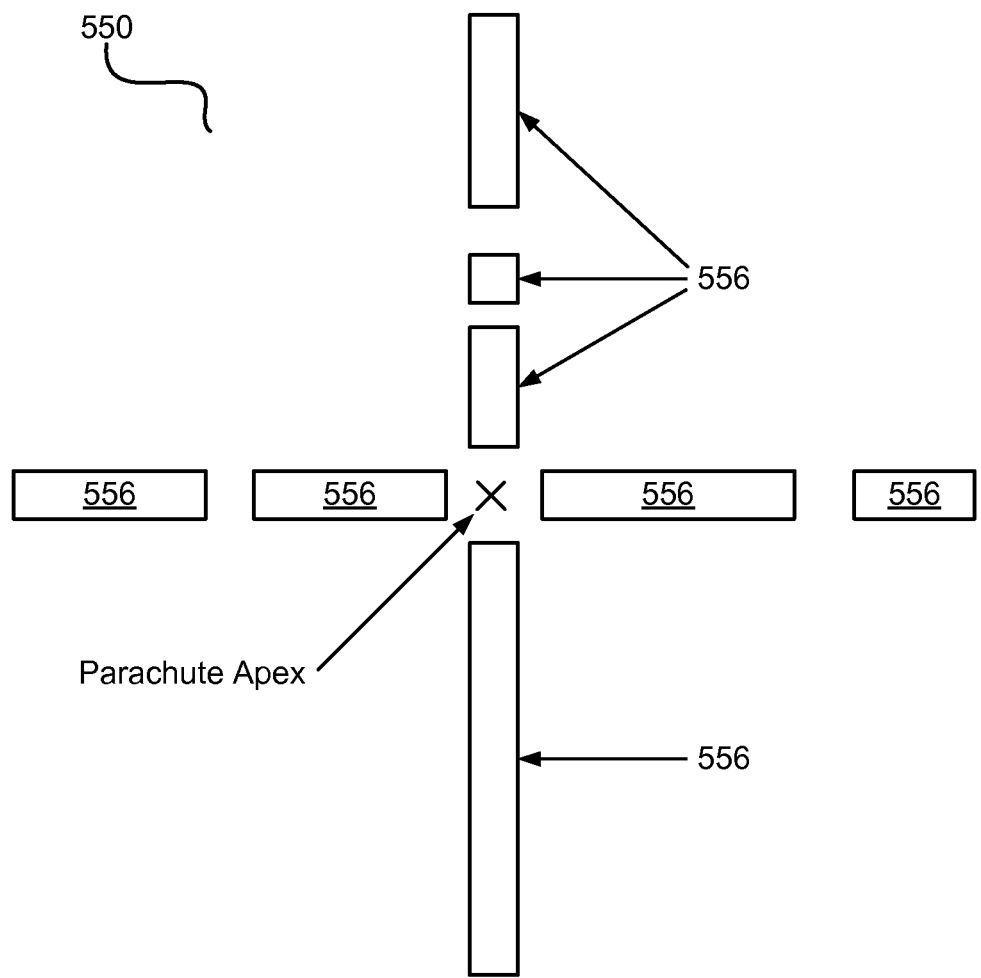

With reference now to FIGS. 5A, 5B, and 5C, in various exemplary embodiments, an insert 150, for example insert 550, may be configured as a set of individual, separated segments 556. Stated another way, insert 550 may be considered to be made up of multiple segments 556 which are not necessarily directly coupled to one another. Each segment 556 of insert 550 may be configured and located to at least partially block a corresponding gap in a parachute canopy. For example, each segment 556 of insert 550 may extend from one discrete coupling point to an adjacent discrete coupling point.

Thus, insert 550 may be considered to be similar, for example, to insert 350 as illustrated in FIG. 3D in terms of overall dimensions, while utilizing less material and/or potentially blocking less airflow through a corresponding parachute canopy. Insert 550 (and individual segments 556 thereof) may be coupled to a parachute canopy via any method and/or components suitable for coupling other exemplary inserts 150 disclosed herein. Multiple coupling components may be utilized, and different segments 556 may be coupled using different methods and/or components, as desired. Additionally, segments 556 may vary in size and/or material from one another.

With particular reference to FIG. 5A, in an exemplary embodiment, insert 550 may be configured as a set of similarly sized segments 556. Segments 556 are disposed between discrete coupling points on a corresponding parachute canopy to at least partially block gaps therebetween.

Turning to FIG. 5B, in some exemplary embodiments, insert 550 is configured as a set of segments 556, at least some of which differ in size from one another, but which are radially symmetric with respect to the apex of a corresponding parachute. For example, insert 550 may be configured with a first group of segments 556 disposed closest to the apex of a parachute canopy and having a first size. Insert 550 may be further configured with a second group of segments 556 disposed radially outward from the first group of segments 556 and having a second size different than the first size. Insert 550 may also be configured with a third group of segments 556, a fourth group of segments 556, and so forth, as desired. The construction, coupling, and placement of segments 556 forming insert 550 are configured to achieve one or more desired characteristics of a corresponding parachute, for example structural strength, weight, geometric porosity, and/or the like.

With reference now to FIG. 5C, in certain exemplary embodiments, insert 550 is configured as a set of segments 556, at least some of which differ in size from one another, and at least some of which are not symmetrical with respect to the apex of a corresponding parachute. For example, the number of segments 556 disposed between two particular modules/gores of a parachute canopy may vary from the number of segments 556 disposed between two other modules/gores of a parachute canopy. Moreover, the length, width, material, and/or reinforcement of a particular segment 556 may differ from that of another segment 556. The construction, coupling, and placement of segments 556 forming insert 550 are configured to achieve one or more desired characteristics of a corresponding parachute, for example structural strength, weight, geometric porosity, and/or the like.

Figure 6B:
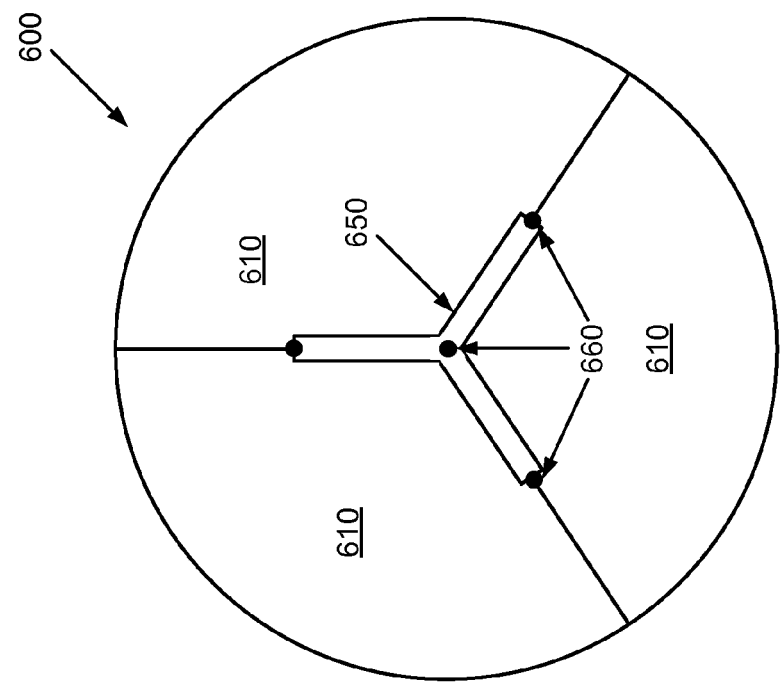
FIGS. 6A and 6B illustrate an insert coupled to a parachute in accordance with various exemplary embodiments.
Figure 6A:
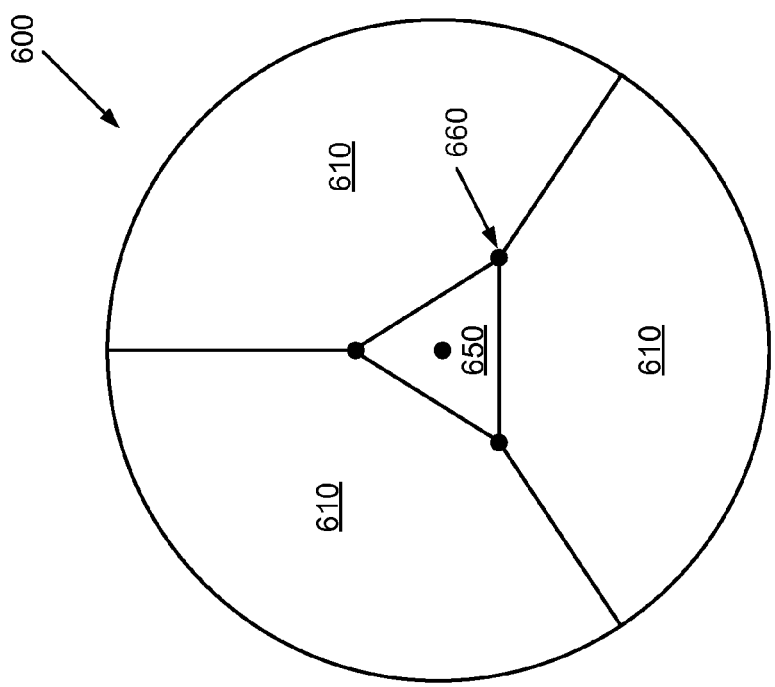

In various exemplary embodiments, an insert 150 is configured with a number N of "arms" or extensions and/or connection points corresponding to the number of modules/gores in a parachute canopy. With reference now to FIGS. 6A and 6B, in an exemplary embodiment, an insert 650 is coupled to three modular panels 610 forming the canopy of a parachute 600. In this exemplary embodiment, insert 650 may be triangular (as illustrated in FIG. 6A), i.e., corresponding to the three panels 610; alternatively, insert 650 may take the form of the three-point star (as illustrated in FIG. 6B), once again corresponding to the three panels 610. In this manner, a portion of insert 650 is available for coupling at one or more connection points 660, similar to other inserts disclosed above. Additionally, a portion of insert 650 at least partially blocks one or more gaps between connections points 660 and joining panels 610.

Similarly, in a parachute having 5 canopy panels, an insert 150 may be configured with 5 sides and/or arms, in a parachute having 6 canopy panels, an insert 150 may be configured with 6 sides and/or arms, and so forth. Moreover, in a parachute having 2 canopy panels, insert 150 may take the form of a linear strip (i.e., at least partially extending along the border between the 2 canopy panels).

Figure 7A:
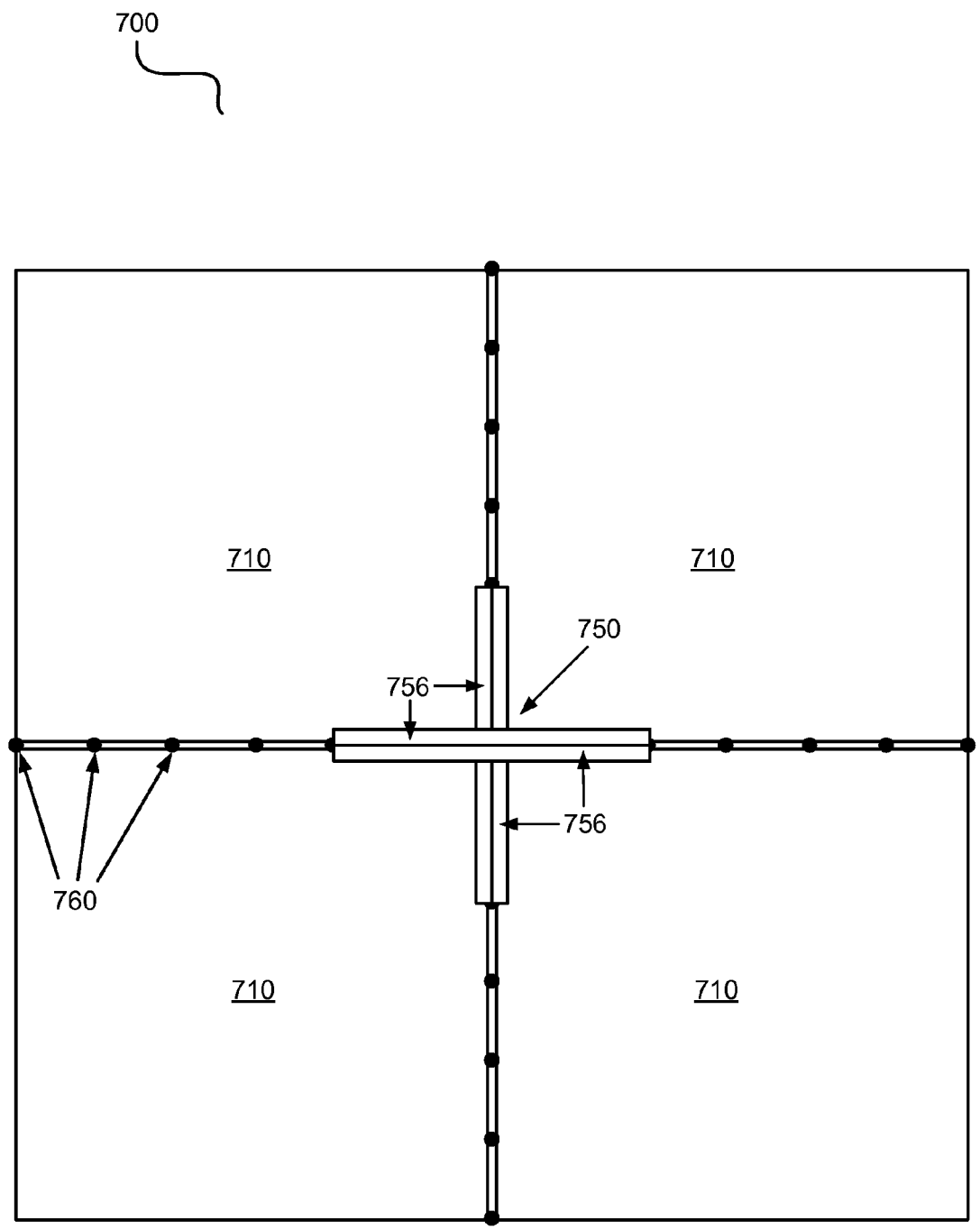
FIGS. 7A, 7B, and 7C illustrate an insert coupled to a parachute in accordance with various exemplary embodiments.
Figure 7B:
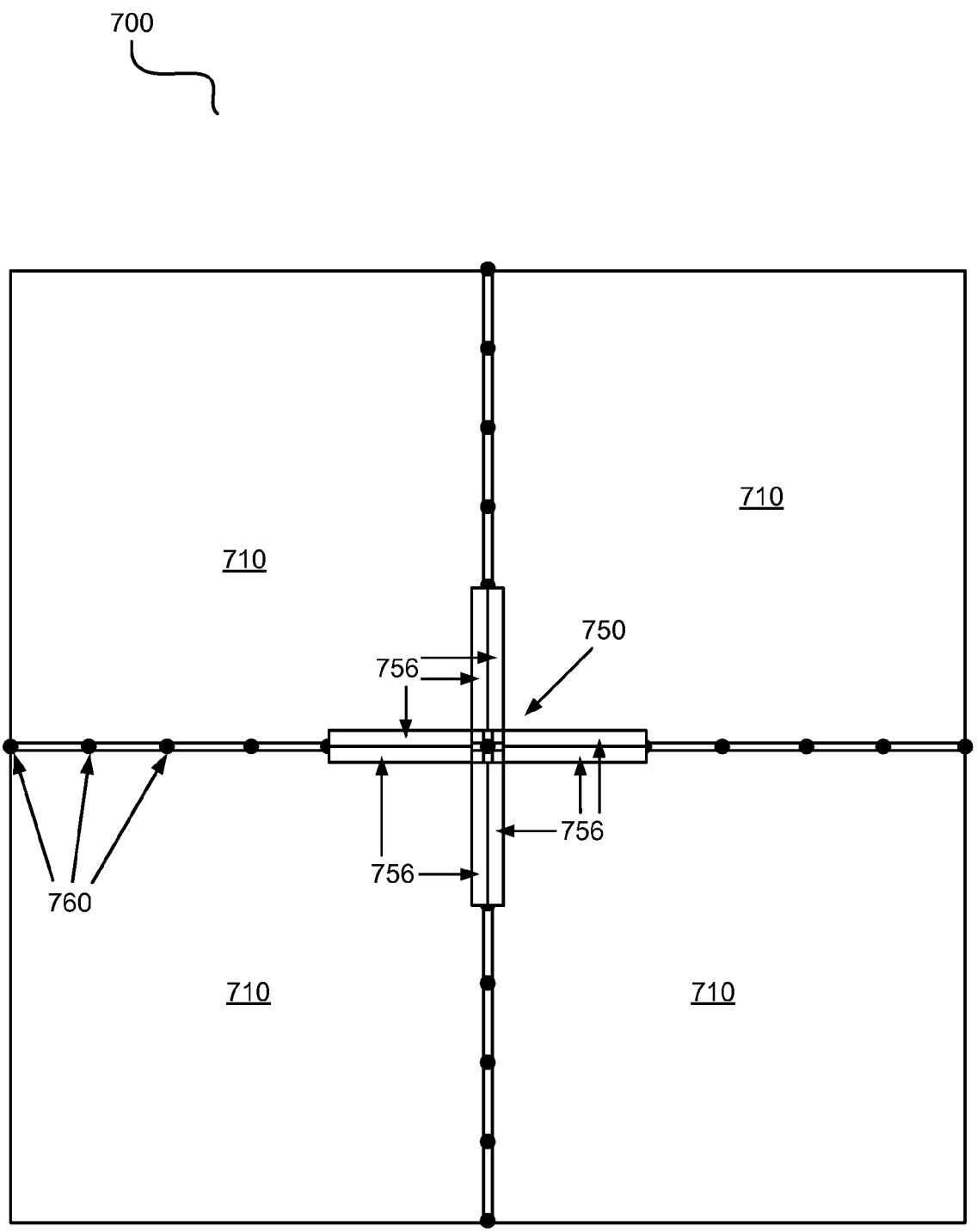
Figure 7C:
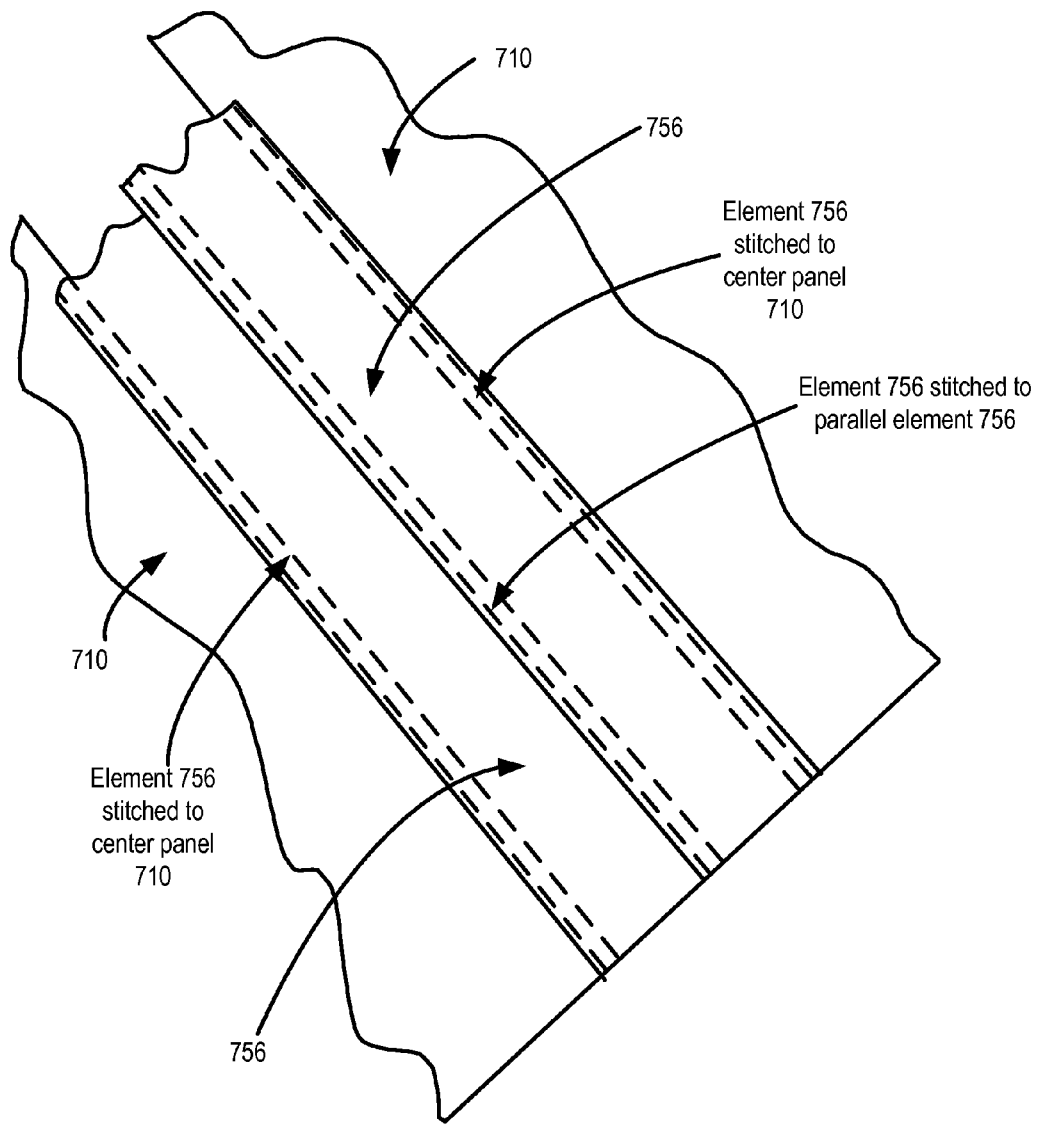

Turning now to FIGS. 7A, 7B, and 7C, in various exemplary embodiments, an insert 150 (for example, insert 750) may be configured to facilitate simplified assembly and/or disassembly of parachute 700. Insert 750 may join parachute 700 modules along a continuous distance, in addition to (or rather than) at discrete points. For example, a cruciform parachute 700 may be configured with a number of center panels 710 (e.g., 4 center panels 710), and center panels 710 may be coupled to one another via insert 750. In an exemplary embodiment, insert 750 comprises a first pair of linear tape/ribbon/webbing elements 756 disposed in a first direction (for example, along a line defined by a boundary between center panels 710), and a second pair of linear tape/ribbon/webbing elements 756 disposed in a second direction (for example, along a line defined by a different boundary between center panels 710 and hence crosswise of the first pair of elements 756).

Aspects of insert 750 are desirably utilized when a center panel 710 of parachute 700 is to be removed for repair or replacement. The linear tape/ribbon/webbing elements 756 comprising insert 750 may be separated from one another, while remaining coupled to a corresponding center panel 710. Elements 756 are robust and thus can withstand repeated disassembly and reassembly without being damaged to the point of needing repair. In contrast, if the disassembly and reassembly involved a center panel 710 (which is comprised of a material less robust than elements 756), the center panel 710 may be damaged to the point of needing repair simply because it was being disassembled to facilitate another needed repair, either of that center panel 710 or another center panel 710 in parachute 700. For example, center panel 710 may comprise a fabric having a weight of between about 1 ounce to about 2 ounces per square yard, while elements 756 may comprise tape, ribbon, webbing and/or the like having a weight of between about 3 ounces and about 20 ounces per square yard; therefore, elements 756 are much stronger than center panels 710 and disassembly nicks, fraying, and the like to elements 756 are largely inconsequential. Elements 756 may be repeatedly coupled to one another, and uncoupled from one another, as needed, for example via hand stitching, machine stitching, staples, and/or the like, in order to facilitate assembly, disassembly, and/or repair of parachute 700.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

What is claimed is:

1. A parachute, comprising:
   a first gore;
   a second gore coupled to the first gore at a set of discrete points, wherein adjacent points in the set of discrete points have a gap permitting airflow therebetween; and
   an insert coupled to the first gore and the second gore at a plurality of points in the set of discrete points, wherein, when the parachute is inflated, the insert at least partially blocks airflow through a plurality of the gaps.

2. The parachute of claim 1, wherein the insert is disposed on the interior of the canopy of the parachute at the parachute apex.

3. The parachute of claim 1, wherein the insert is disposed on the exterior of the canopy of the parachute at the parachute apex.

4. The parachute of claim 1, wherein the insert is 2-dimensional.

5. The parachute of claim 1, wherein the insert is 3-dimensional.

6. The parachute of claim 1, wherein the insert is at least one of square or diamond in shape.

7. The parachute of claim 1, wherein the insert is star-like in shape.

8. The parachute of claim 1, wherein the insert is coupled to the plurality of points via at least one of cord or webbing.

9. The parachute of claim 1, wherein the first gore and the second gore comprise a first material, and wherein the insert comprises a second material stronger than the first material.

10. A method for aerial delivery of a payload, the method comprising:
    separating the payload from an aircraft; and
    deploying a parachute to slow the descent of the payload through the air, wherein the parachute comprises:
    a first gore;
    a second gore coupled to the first gore at a set of discrete points, wherein adjacent points in the set of discrete points have a gap permitting airflow therebetween; and
    an insert coupled to the first gore and the second gore at a plurality of points in the set of discrete points, wherein, when the parachute is inflated, the insert at least partially blocks airflow through a plurality of the gaps.

11. The method of claim 10, wherein the insert is disposed on the interior of the canopy of the parachute.

12. The method of claim 10, wherein the insert is disposed on the exterior of the canopy of the parachute.

13. The method of claim 10, wherein the insert, during inflation of the parachute, acts as a pilot parachute to stabilize the canopy of the parachute.

14. The method of claim 10, wherein the first gore and the second gore comprise a first material, and wherein the insert comprises a second material stronger than the first material.

15. The method of claim 10, wherein the insert is disposed at the apex of the parachute.

16. A parachute, comprising:
    a parachute canopy comprising a first canopy portion and second canopy portion, the first canopy portion and the second canopy portion coupled to one another at a set of discrete points, wherein adjacent points in the set of discrete points have a gap permitting airflow therebetween; and
    an insert coupled to the parachute canopy, the insert comprising:
    a rectangular center portion; and
    four triangular side portions, each triangular side portion coupled to a side of the rectangular center portion via stitching,
    wherein the rectangular center portion is disposed at the apex of the cruciform parachute, and
    wherein each of the triangular side portions are coupled to the parachute canopy at a plurality of points in the set of discrete points.

* * * * *